US012790275B2

(12) United States Patent
Alvarez De Diego et al.

(10) Patent No.: US 12,790,275 B2
(45) Date of Patent: Nov. 10, 2026

(54) TILES OR SLABS OF COMPACTED CERAMIC MATERIAL

(71) Applicant: Cosentino Research & Development, S.L., Cantoria (ES)

(72) Inventors: Javier Alvarez De Diego, Cantoria (ES); Jose Manuel Benito Lopez, Cantoria (ES)

(73) Assignee: Cosentino Research & Development, S.L., Cantoria (ES)

( * ) Notice: Subject to any disclaimer, the term of this patent is extended or adjusted under 35 U.S.C. 154(b) by 998 days.

(21) Appl. No.: 17/816,094

(22) Filed: Jul. 29, 2022

(65) Prior Publication Data

US 2023/0048652 A1 Feb. 16, 2023

(30) Foreign Application Priority Data

Aug. 6, 2021 (EP) .................................... 21382742

(51) Int. Cl.

*C04B 35/14* (2006.01)
*C04B 35/645* (2006.01)

(52) U.S. Cl.

CPC ............ *C04B 35/14* (2013.01); *C04B 35/645* (2013.01); *C04B 2235/3206* (2013.01); *C04B 2235/3208* (2013.01); *C04B 2235/3217* (2013.01); *C04B 2235/3244* (2013.01); *C04B 2235/3418* (2013.01); *C04B 2235/349* (2013.01)

(58) Field of Classification Search

CPC ............ C04B 35/14; C04B 2235/3206; C04B 2235/3208; C04B 2235/3217; C04B 2235/3244; C04B 2235/3418; C04B 2235/3436; C04B 2235/3232; C04B 2235/3445; C04B 2235/3454; C04B 2235/3472; C04B 2235/3481; C03C 3/087; C03C 8/02; C03C 10/0045

See application file for complete search history.

(56) References Cited

U.S. PATENT DOCUMENTS

| | | | | |
|---|---|---|---|---|
| 2016/0031736 A1* | 2/2016 | Muehlke | C03B 23/023 | 428/172 |
| 2017/0233287 A1* | 8/2017 | Li | C03C 3/089 | 428/172 |

FOREIGN PATENT DOCUMENTS

| | | | | |
|---|---|---|---|---|
| CN | 104926281 A | 9/2015 | | |
| CN | 109650848 A | 4/2019 | | |
| EP | 3459919 A1 | 3/2019 | | |
| WO | 2016193500 A1 | 12/2016 | | |
| WO | WO-2020073254 A1 * | 4/2020 | ............. | C03B 32/02 |

OTHER PUBLICATIONS

Siligardi C et al: “Influence of CaO—$ZrO_2$—$Al_2$ $O_3$—$SiO_2$ glass-ceramic frits on the technological properties of porcelain stoneware bodies”, Ceramics International, Elsevier, Amsterdam, NL, vol. 37, No. 6, Feb. 4, 2011 (Feb. 4, 2011), pp. 1851-1858.

Tarhan Muge: “Whiteness improvement of porcelain tiles incorporated with anorthite and diopside phases”, Journal of Thermal Analysis and Calorimetry, Kluwer, Dordrecht, NL, vol. 138, No. 2, Apr. 29, 2019 (Apr. 29, 2019), pp. 929-936.

N.T. Selli: “Development of anorthite based white porcelain stoneware tile compositions”,Ceramics International, vol. 41, No. 6, Jul. 1, 2015 (Jul. 1, 2015), pp. 7790-7795.

International Search Report dated Dec. 7, 2022, PCT/EP2022/071322.

Ma Tiecheng et al., “Ceramic Technology,” China Industry Press, pp. 221-222 (Aug. 30, 2013).

Jiang Chenguang, “Civil Engineering Materials,” China Building Materials Industry Press, p. 317 (Jul. 31, 2017).

* cited by examiner

*Primary Examiner* — Laura A Auer

(74) *Attorney, Agent, or Firm* — Finnegan, Henderson, Farabow, Garrett & Dunner, LLP

(57) ABSTRACT

The disclosure relates to tiles or slabs comprising a fired ceramic material which has a chemical composition with a particular combination of oxides; to a method for the manufacture of said tiles or slabs; and to the use thereof for construction or decoration applications.

17 Claims, No Drawings

TILES OR SLABS OF COMPACTED CERAMIC MATERIAL

This application claims priority to EP Application No. 21382742.1, filed Aug. 6, 2021, the contents of which are incorporated by reference in their entirety.

The disclosure relates to compositions and properties of tiles or slabs, for example, large format tiles or slabs, comprising a ceramic material, such as a highly compacted ceramic material. These tiles or slabs can be used for construction and decoration applications. The disclosure is also concerned with a method of manufacture of the tiles or slabs.

There is currently an ongoing trend in the market of the ceramic tiles towards tiles or slabs of large dimensions (or large format) having extremely reduced open porosity and water absorption, together with outstanding mechanical and chemical/UV resistance.

Many of these large format tiles or slabs comprise a highly compacted vitrified porcelain ceramic layer, frequently incorporating additional layers or deposits for decoration, protection or texturization, applied to one or both major surfaces of the ceramic layer. The tiles or slabs are normally considered to have large format when they exceed, for example, 1.2 m×0.6 m, and they can reach up to 3.2×1.6 m or more, in a variety of thicknesses from 3 mm to 30 mm.

The large sized tiles or slabs, which can be provided with very rich surface and body decorations, are finding increased use in applications where large format slabs of natural or artificial stones were previously employed, such as kitchen or vanity countertops, kitchen splashbacks, wall siding, furniture cladding, tabletops, ventilated façade tiles, stovetops, fireplaces, among others. For most of these applications, the large sized tiles or slabs, frequently of 12-30 mm thickness, need to be cut-to-size, to make them fit to the intended use (e.g., as kitchen countertop, façade tile or as tabletop).

Compositions and processes for the manufacture of the referred large format tiles or slabs are known, with multiple manufacturers currently commercializing those products and the machinery for their production at industrial scale.

Zircon or other minerals or materials having a high zirconia content, are frequently used in high relative amounts as a raw material in the manufacture of the ceramic layers used in the large format slabs and tiles, such as in highly white body ceramic layers, due to its good opacifying characteristics. Zircon increases the white color lightness of the ceramic layer.

These ceramic layers comprising high amounts of zirconia, when manufactured with the desired whiteness, high mechanical resistance, high density, and low porosity (low water absorption), have the significant drawback that they tend to be difficult to cut, even for skilled stonemasons using specialized tools, more remarkably if the ceramic layer thickness in the slab or tile is ≥12 mm.

International Publication WO 2016/193500 discloses compacted ceramic materials, including slabs of 3.20×1.44 $m^2$ surface and 0.7-3 cm, with low porosity, obtained by firing certain mixtures of clay, kaolin and feldspar to a maximum temperature of 1.000-1.200° C.

In addition, CN 104926281A is concerned with a method for the preparation of low-cost porcelain bricks or tiles. The bricks or tiles disclosed do not comprise any zircon, have at least 1.5% of $Fe_2O_3$+$TiO_2$ and in all cases have residual open porosity leading to water absorption >0.13%.

Therefore, there is still a need for further ceramic materials comprising zirconia, which have high mechanical resistance, high density, and low porosity (low water absorption) and which can be more easily cut.

The inventors have surprisingly found that titles or slabs comprising a fired ceramic material with a chemical composition comprising a combination of oxides as defined herein present relevant advantages when compared with similar tiles or slabs in the art, advantages when considering the manufacture and handling of pieces of large dimensions.

Remarkably, the improved tiles or slabs according to the disclosure can be more efficiently cut with available tools. By this it is meant that the tiles or slabs of the disclosure can either be cut at a faster speed without defects and without damaging the cutting disk or tools, and/or that more tiles or slabs can be cut with the same disk without having to sharpen or replace it.

Simultaneously, it has been found that the ceramic material has a significantly reduced density, thus reducing the weight of the slab or tile.

The handling of unfired compacted ceramic material on the manufacturing lines, e.g. the transport from the press through the drying kilns and stations for the application of additional layers (e.g. inks, glazes), to the firing kilns, which is especially delicate in case of shapes of large dimensions, can be significantly improved.

Additionally, it has also been found that the shrinkage of the ceramic material during firing is reduced when compared with previously known high zirconia ceramic compositions. Consequently, more surface of the tile or slab is obtained per compacting/firing cycle.

Moreover, these advantages are achieved without compromising or deteriorating the other desirable properties of the slabs or tiles comprising zirconia ceramic materials, such as low or negligible water absorption, excellent colorimetry (whiteness), or high mechanical resistance.

Thus, in a first aspect, the disclosure is directed to a tile or slab comprising a fired ceramic material, wherein the fired ceramic material has a length of at least 1.2 m and a width of at least 0.6 m, and has a chemical composition comprising a combination of oxides according to:

| | |
|---|---|
| $SiO_2$ | from 54.0 wt %-64.0 wt % |
| $Al_2O_3$ | from 17.5 wt %-23.0 wt % |
| CaO | from 2.7 wt %-6.8 wt % |
| MgO | from 1.0 wt %-5.5 wt % |
| $ZrO_2$ | from 2.0 wt %-6.6 wt % |

based on the total weight of the fired ceramic material.

In a second aspect, the disclosure is concerned with the use of a tile or slab according to the present disclosure for the manufacture of a kitchen or vanity countertop, kitchen splashback, shower tray, wall or floor covering, furniture cladding, tabletop, ventilated façade tile, stovetop, stair step, or fireplace.

In another aspect, the disclosure is directed to a kitchen or vanity countertop, kitchen splashback, shower tray, wall or floor covering, furniture cladding, tabletop, ventilated façade tile, stovetop, stair step or fireplace made from a title or slab according to the disclosure.

In a further aspect, the disclosure is directed to a method for manufacturing a tile or slab according to the present disclosure, comprising:

a) preparing discrete agglomerates of ceramic raw materials;
b) shaping and compacting the agglomerates to provide a shaped and compacted material with a length of at least 1.2 m and a width of at least 0.6 m;

c) firing the shaped and compacted material with a temperature profile having a maximum between 1,100° C. to 1,300° C.;

wherein the ceramic raw materials of step a) comprise:

(i) from 25 wt %-45 wt % of clay materials, wherein the clay materials comprising one or more of kaolin, bentonite clays, fire clays, stoneware clays, ball clays, and mixtures thereof; and (ii) from 55 wt %-75 wt % of non-clay materials, wherein the non-clay materials comprising one or more of feldspars, nepheline syenite, talc, corundum, quartz minerals, and mixtures thereof, based on the total weight of said ceramic raw materials; and wherein the non-clay materials (ii) also comprise:

from 4 wt %-12 wt % of a calcium containing material chosen from wollastonite, diopside, tremolite, garnet, and mixtures thereof, and from 2 wt %-10 wt % of a zirconium containing material chosen from a material comprising from 45 wt %-100 wt % of $ZrO_2$;

based on the total weight of the ceramic raw materials in a).

DESCRIPTION

The term "ceramic material" or "fired ceramic material" as used herein refers to a material consisting of inorganic, polycrystalline, non-metallic compounds, the fundamental characteristic of which is that they are consolidated in solid state by means of high-temperature heat treatments (firing) and are formed by a combination of crystalline and glassy phases. The inorganic compounds are formed by metallic and non-metallic chemical elements bound by ionic or covalent bonds.

The (fired) ceramic material according to the present disclosure is a compacted or ultra-compacted ceramic material. That is, a ceramic material that has been compacted at a pressure of at least 350 kg/cm$^2$, for example at least 400 kg/cm$^2$.

The terms "tile" or "slab" as used herein are meant, in general, to be an essentially flat and uniform thickness article, such as of square or rectangular parallelepiped form. These terms should be understood to include and be interchangeable with board, plate, plank, panel, sheet, block, and the like. The terms "length", "width" and "thickness" are used herein as understood generally; e.g. "length" refers to the longest of the three dimensions of an object, "width" refers to the longest dimension of an object that is perpendicular to the length, and "thickness" refers to the remaining dimension that is perpendicular to the length and the width.

The composition of the fired ceramic material and of the raw materials might be obtained, e.g., by X-ray fluorescence (XRF), a technique well-established in the mineral technological field. The composition indicated herein corresponds, e.g., to the average, calculated from at least 3 repetitions of the measurement, of the composition of samples containing a mass of the ceramic material or the raw material (e.g., 1 gram of material).

An amount of crystalline phases in the (fired) ceramic material and in the raw materials can be determined, e.g., by powder X-Ray Diffraction analysis (XRD) using the Rietveld method for quantification, a technique amply used in the field.

In the present disclosure, "glassy phase" or "vitrified phase" is understood to mean the amorphous, non-crystalline phase (i.e., without long range atomic order), and/or the phase with non-coherent x-ray diffraction, embedding the crystalline phases. The glassy or vitrified phase can be quantified, e.g., by XRD.

The skilled person readily understands that, when a composition or material is defined by the weight percentage values of all the components it comprises, these values can never sum up to a value which is greater than 100%. The amount of all components that said material or composition comprises adds up to 100% of the weight of the composition or material.

Unless specifically stated otherwise, or unless they are clearly incompatible, all the embodiments presented herein are combinable for each aspect of the disclosure, and also between the different aspects.

In a first aspect, the disclosure is directed to a tile or slab comprising a fired ceramic material that has a length of at least 1.2 m and a width of at least 0.6 m, wherein the fired ceramic material has a chemical composition comprising a combination of oxides according to:

| | |
|---|---|
| $SiO_2$ | from 54.0 wt %-64.0 wt % |
| $Al_2O_3$ | from 17.5 wt %-23.0 wt % |
| CaO | from 2.7 wt %-6.8 wt % |
| MgO | from 1.0 wt %-5.5 wt % |
| $ZrO_2$ | from 2.0 wt %-6.6 wt % |

based on the total weight of the fired ceramic material.

The $SiO_2$ content ranges from 56.0 wt %-62.0 wt %.

The $Al_2O_3$ content ranges from 18.3 wt %-22.3 wt %.

The embodiments herein may be additionally characterized by having a ratio of weight percentages of $SiO_2/Al_2O_3$ ranging from 2.4-3.3, or from 2.5-3.2.

In particular embodiments, the $ZrO_2$ comprised in the fired ceramic material ranges from 3.1 wt %-5.8 wt %, or from 3.2 wt %-5.5 wt %. In some embodiments, the $ZrO_2$ content ranges from 3.2 wt %-5.1 wt %.

The CaO content in the ceramic material ranges from 3.2 wt %-5.5 wt %.

The MgO content in the ceramic material ranges from 1.2 wt %-3.8 wt %.

Alternatively, or in addition to the previous embodiments, the fired material is characterized by having a composition where the sum of the weight percentages of CaO+MgO ranges from 4.3 wt %-7.3 wt %, or ranges from 4.8 wt %-6.8 wt %.

The fired ceramic material can comprise other oxides, such as $K_2O$, $Na_2O$, $Fe_2O_3$ and/or $TiO_2$, such as in a total amount less than 10.0 wt %, based on the total weight of the fired ceramic material.

The fired ceramic material can also comprise $Fe_2O_3$ and/or $TiO_2$, such as in a total amount less than 1.3 wt %, or less than 0.9 wt %, based on the total weight of the fired ceramic material. In some embodiments, the sum of the amounts of $Fe_2O_3$+$TiO_2$ in the composition of the ceramic material can range from 0.1 wt %-1.3 wt %, or from 0.1 wt %-0.9 wt %. In an embodiment, the sum of the amounts of $Fe_2O_3$+$TiO_2$ ranges from 0.1 wt %-0.6 wt %.

In some embodiments, the ceramic material comprises $Fe_2O_3$ ranging from 0.05 wt %-0.6 wt %, or from 0.1 wt %-0.5 wt %. In some embodiments, it comprises $Fe_2O_3$ ranging from 0.1 wt %-0.4 wt %.

In some embodiments, the ceramic material comprises $TiO_2$ ranging from 0.05 wt %-0.3 wt %, or from 0.05 wt %-0.2 wt %. In some embodiments, it comprises $TiO_2$ ranging from 0.05 wt %-0.15 wt %.

The fired ceramic material can also comprise $K_2O$ and/or $Na_2O$ as additional oxides in the composition, such as in a total amount less than 8.0 wt %, or less than 7.0 wt %, based on the total weight of the fired ceramic material. In some embodiments, the sum of the amount of $K_2O$+$Na_2O$ in the composition of the ceramic material ranges from 2.5 wt %-8.0 wt %, or from 3.9 wt %-7.0 wt %. In an embodiment, the sum of the amount of $K_2O$+$Na_2O$ ranges from 5.3 wt %-6.4 wt %.

In some embodiments, the ceramic material comprises $K_2O$ ranging from 1.0 wt %-4.2 wt %, or from 1.9 wt %-3.7 wt %. In an embodiment, it comprises $K_2O$ ranging from 2.8 wt %-3.5 wt %.

In some embodiments, the ceramic material comprises $Na_2O$ ranging from 1.5 wt %-3.8 wt %, or from 2.0 wt %-3.3 wt %. In an embodiment, it comprises $Na_2O$ ranging from 2.5 wt %-2.9 wt %.

In some embodiments, the sum of the amount of $SiO_2$, $Al_2O_3$, CaO, MgO and $ZrO_2$ represents at least 80 wt %, such as at least 85 wt %, of the total weight of the fired ceramic material. In a further embodiment, the sum of the amount of $SiO_2$, $Al_2O_3$, CaO, MgO and $ZrO_2$ represents at least 90 wt % of the total weight of the fired ceramic material.

In some embodiments, the sum of the amount of $SiO_2$, $Al_2O_3$, CaO, MgO, $ZrO_2$, $K_2O$, $Na_2O$, $Fe_2O_3$ and $TiO_2$, represents at least 90 wt %, such as at least 95 wt %, of the total weight of the fired ceramic material.

The fired ceramic material may have a chemical composition comprising a combination of oxides according to:

| | |
|---|---|
| $SiO_2$ | from 56.0 wt %-62.0 wt % |
| $Al_2O_3$ | from 18.3 wt %-22.3 wt % |
| CaO | from 3.2 wt %-5.5 wt % |
| MgO | from 1.2 wt %-3.8 wt % |
| $ZrO_2$ | from 3.1 wt %-5.8 wt % |

based on the total weight of the fired ceramic material.

The fired ceramic material may have a chemical composition comprising a combination of oxides according to:

| | |
|---|---|
| $SiO_2$ | from 54.0 wt %-64.0 wt % |
| $Al_2O_3$ | from 17.5 wt %-23.0 wt % |
| CaO | from 2.7 wt %-6.8 wt % |
| MgO | from 1.0 wt %-5.5 wt % |
| $ZrO_2$ | from 2.0 wt %-6.6 wt % |
| $Fe_2O_3$ | from 0.05 wt %-0.6 wt % |
| $TiO_2$ | from 0.05 wt %-0.3 wt % |

based on the total weight of the fired ceramic material.

The fired ceramic material may have a chemical composition comprising a combination of oxides according to:

| | |
|---|---|
| $SiO_2$ | from 56.0 wt %-62.0 wt % |
| $Al_2O_3$ | from 18.3 wt %-22.3 wt % |
| CaO | from 3.2 wt %-5.5 wt % |
| MgO | from 1.2 wt %-3.8 wt % |
| $ZrO_2$ | from 3.1 wt %-5.8 wt % |
| $Fe_2O_3$ | from 0.05 wt %-0.6 wt % |
| $TiO_2$ | from 0.05 wt %-0.3 wt % |

based on the total weight of the fired ceramic material.

The fired ceramic material may have a chemical composition comprising a combination of oxides according to:

| | |
|---|---|
| $SiO_2$ | from 54.0 wt %-64.0 wt % |
| $Al_2O_3$ | from 17.5 wt %-23.0 wt % |
| CaO | from 2.7 wt %-6.8 wt % |
| MgO | from 1.0 wt %-5.5 wt % |
| $ZrO_2$ | from 2.0 wt %-6.6 wt % |
| $Fe_2O_3$ | from 0.05 wt %-0.6 wt % |
| $TiO_2$ | from 0.05 wt %-0.3 wt % |
| $Na_2O$ | from 1.5 wt %-3.8 wt % |
| $K_2O$ | from 1.0 wt %-4.2 wt % |

based on the total weight of the fired ceramic material.

The fired ceramic material may have a chemical composition comprising a combination of oxides according to:

| | |
|---|---|
| $SiO_2$ | from 56.0 wt %-62.0 wt % |
| $Al_2O_3$ | from 18.3 wt %-22.3 wt % |
| CaO | from 3.2 wt %-5.5 wt % |
| MgO | from 1.2 wt %-3.8 wt % |
| $ZrO_2$ | from 3.1 wt %-5.8 wt % |
| $Fe_2O_3$ | from 0.05 wt %-0.6 wt % |
| $TiO_2$ | from 0.05 wt %-0.3 wt % |
| $Na_2O$ | from 2.0 wt %-3.3 wt % |
| $K_2O$ | from 1.9 wt %-3.7 wt % |

In some embodiments, there might be other inorganic oxides present in the composition of the ceramic material, as well as some material which is calcined and desorbed during the XRF analysis at 1050° C. until there is no more weight lost (known as weight 'lost on ignition' or L.O.I.).

In some embodiments, the L.O.I. is lower than 10.0 wt %, such as lower than 6.0 wt %, or lower than 5.0 wt %, based on the weight of the ceramic material. In an embodiment, the L.O.I. is lower than 3.0 wt % based on the weight of the ceramic material. In a further embodiment, the amount of L.O.I. is in the range 0.01-6.0 wt % or 0.5-5.0 wt %, based on the weight of the ceramic material.

The fired ceramic material might be composed by a predominant vitrified (or glassy or amorphous) phase, with at least 40 wt %, such as at least 50 wt % of glassy or amorphous phase, based on the total weight of the fired ceramic material. Said percentage can be determined for example by XRD. In an embodiment, the fired ceramic material comprises 50 wt %-80 wt % of glassy phase, such as 55 wt %-75 wt % of glassy phase based on the weight of the ceramic material.

It is found advantageous in certain embodiments that the fired ceramic material does not comprise or comprise less than 10 wt %, such as less than 5 wt %, and further for example, less than 2 wt % of mullite as crystalline phase, based on the weight of the fired ceramic material.

The fired ceramic material may comprise from 1 wt %-11 wt %, or from 1 wt %-9 wt % of zircon as crystalline phase, based on the weight of the fired ceramic material. In an embodiment, it comprises from 4 wt %-9 wt % of zircon as crystalline phase.

Also, the fired ceramic material may comprise from 1 wt %-8 wt %, or from 1 wt %-6 wt % of quartz as crystalline phase, based on the weight of the fired ceramic material. In an embodiment, it comprises from 4 wt %-6 wt % of quartz as crystalline phase.

The fired ceramic material may comprise from 5 wt %-25 wt %, or from 10 wt %-20 wt % of anorthite as crystalline phase, based on the weight of the fired ceramic material.

Also, the fired ceramic material may comprise from 1 wt %-10 wt %, or from 1 wt %-8 wt % of albite as crystalline phase, based on the weight of the fired ceramic material. In an embodiment, it comprises from 4 wt %-8 wt % of albite as crystalline phase.

Said crystalline phases can be measured, e.g., by XRD, as described herein.

According to an embodiment of the disclosure, the fired ceramic material comprises from 50 wt %-80 wt % of glassy phase, from 0 wt %-5 wt % of mullite as crystalline phase, from 1 wt %-11 wt % of zircon as crystalline phase and from 1 wt %-8 wt % of quartz as crystalline phase, based on the weight of the fired ceramic material.

According to an embodiment of the disclosure, the fired ceramic material comprises from 50 wt %-80 wt % of glassy phase, from 0 wt %-5 wt % of mullite as crystalline phase, from 1 wt %-11 wt % of zircon as crystalline phase and from 1 wt %-8 wt % of quartz as crystalline phase, from 5 wt %-25 wt % of anorthite as crystalline phase and from 1 wt %-10 wt % of albite as crystalline phase, based on the weight of the fired ceramic material.

In a further embodiment, the fired ceramic material comprises from 50 wt %-80 wt % of glassy phase, from 0 wt %-2 wt % of mullite as crystalline phase, from 1 wt %-9 wt % of zircon as crystalline phase and from 1 wt %-6 wt % of quartz as crystalline phase, based on the weight of the fired ceramic material.

In another embodiment, the fired ceramic material comprises from 50 wt %-80 wt % of glassy phase, from 0 wt %-2 wt % of mullite as crystalline phase, from 1 wt %-9 wt % of zircon as crystalline phase and from 1 wt %-6 wt % of quartz as crystalline phase, from 10 wt %-20 wt % of anorthite as crystalline phase and from 1 wt %-8 wt % of albite as crystalline phase, based on the weight of the fired ceramic material.

The fired ceramic material of the disclosure might be a porcelain material, for example a porcelain material as defined in section 3 of EN 14411:2016 or in section 3 of ISO 13006:2018. In some embodiments, the fired ceramic material is a porcelain material of the group I (either AI or BI), and further for example, a porcelain material of the group BIa, according to, for example, the classification in Table 1 of EN 14411:2016. The fired ceramic material might also be a porcelain stoneware.

The fired ceramic material is characterized by having a water absorption of 0.5%, or such as 0.1%, or further for example 0.05%, when measured, e.g., according to ISO 10545-3:2018 (vacuum method). In some embodiments, the water absorption of the ceramic material is 0.01% when measured according to this method.

According to the embodiments herein, the fired ceramic material might have an apparent density 2.55 g/cm$^3$, such as 2.10 g/cm$^3$-2.55 g/cm$^3$, further for example, 2.25 g/cm$^3$-2.50 g/cm$^3$, or 2.25 g/cm$^3$-2.45 g/cm$^3$, as measured for instance according to ISO 10545-3:2018 (vacuum method) standard.

In some embodiments, the fired ceramic material of any of the embodiments has a rectangular parallelepiped form. In some embodiments, it is in the form of a layer. In some embodiments, it has a large format, with a major surface with at least 1.2 m length and 0.6 m width, or at least 2.4 m length and 1.2 m width. In an embodiment, it has 3.1 m length and 1.4 m width. The thickness of the fired ceramic material might range from 3-40 mm, or from 4-30 mm.

In some embodiments, the thickness of the fired ceramic material ranges from 12 mm-40 mm, or from 12 mm-30 mm.

The fired ceramic material can be 1.200 mm-3.500 mm in length, 600 mm-1.800 mm in width and 3 mm-40 mm in thickness. In another embodiment, the fired ceramic material can be 2.000 mm-3.500 mm in length, 1.000 mm-1.800 mm in width and 3 mm-40 mm in thickness. In a further embodiment, the fired ceramic material can be 2.400 mm-3.200 mm in length, 1.200 mm-1.500 mm in width and 4 mm-30 mm in thickness.

The fired ceramic material of any of the embodiments disclosed herein is a component of the slabs or tiles of the disclosure. The fired ceramic material might represent 85 wt %-100 wt %, or 90 wt %-100 wt %, of the total weight of the slab or tile. In an embodiment, the fired ceramic material represents 95 wt %-100 wt % of the total weight of the slab or tile.

In an embodiment, the tile or slab consists of the fired ceramic material of the disclosure.

Alternatively, the tile or slab may comprise additional materials or components besides the fired ceramic material, as known in the art. For example, it might comprise one or more layers or deposits of at least one additional material selected from additional ceramic or porcelain materials (different from the fired ceramic material of the disclosure), glazes, engobes, inks, frits, grits and mixtures thereof. Said additional materials are usually employed for decoration, protection and/or texturization.

In an embodiment, the fired ceramic material is in the form of a layer and the at least one additional material is in the form of a layer or deposits on one or both major surfaces of the fired ceramic material layer.

In some embodiments, the at least one additional material represents from 0 wt %-10 wt %, such as from 0 wt %-5 wt %, of the total weight of the tile or slab.

In some embodiments, the tile or slab of the disclosure has a large format, with a major surface with at least 1.2 m length and at least 0.6 m width, or at least 2.4 m length and at least 1.2 m width. In an embodiment, it has at least 3.1 m length and at least 1.4 m width. The thickness of the tile or slab might range from 3-40 mm, or from 4-30 mm.

In some embodiments, the thickness of the tile or slab might range from 12 mm-40 mm, or from 12 mm-30 mm.

The tile or slab of the disclosure can be 1,200 mm-3,500 mm in length, 600 mm-1,800 mm in width and 3 mm-40 mm in thickness. In another embodiment, it can be 2,000 mm-3,500 mm in length, 1,000 mm-1,800 mm in width and 3 mm-40 mm in thickness. In a further embodiment, it can be 2,400 mm-3,200 mm in length, 1,200 mm-1,500 mm in width and 4 mm-30 mm in thickness.

The tiles or slabs of the disclosure can be used for construction or decoration applications. They are particularly suitable as a surface for kitchen or vanity countertops, kitchen splashbacks, shower trays, wall or floor coverings, furniture cladding, tabletops, ventilated façade tiles, stovetops, profiles, fireplaces or similar.

Therefore, in another aspect, the disclosure is concerned with the use of a tile or slab according to the present disclosure for the manufacture of a kitchen or vanity countertop, kitchen splashback, shower tray, wall or floor covering, furniture cladding, tabletop, ventilated façade tile, stovetop, stair-step, or fireplace. The tile or slab is preferably cut-to-size in the manufacture of these products.

In another aspect, the disclosure is directed to a kitchen or vanity countertop, kitchen splashback, shower tray, wall or floor covering, furniture cladding, tabletop, ventilated façade tile, stovetop, stair-step or fireplace made from a title or slab according to the disclosure. In this aspect, the tile or slab of the disclosure is preferably cut-to-size to make the kitchen or vanity countertop, kitchen splashback, shower tray, wall or floor covering, furniture cladding, tabletop, ventilated façade tile, stovetop, stair-step or fireplace.

In a further aspect, the disclosure is directed to a method for manufacturing of a tile or slab according to the present disclosure, which comprises:

a) preparing discrete agglomerates of ceramic raw materials;

b) shaping and compacting the agglomerates to provide a shaped and compacted material with a length of at least 1.2 m and a width of at least 0.6 m;

c) firing the shaped and compacted material with a temperature profile having a maximum between 1,100° C. and 1,300° C.;

wherein the ceramic raw materials of step a) comprise:

(i) from 25 wt %-45 wt % of clay materials, wherein the clay materials comprising one or more of kaolin, bentonite clays, fire clays, stoneware clays, ball clays, and mixtures thereof; and (ii) from 55 wt %-75 wt % of non-clay materials, wherein the non-clay materials comprising one or more of feldspars, nepheline syenite, talc, corundum, quartz minerals, and mixtures thereof, based on the total weight of said ceramic raw materials; and wherein in that the non-clay materials (ii) comprise:

from 4 wt %-12 wt % of a calcium containing material chosen from wollastonite, diopside, tremolite, garnet, and mixtures thereof, and from 2 wt %-10 wt % of a zirconium containing material comprising from 45 wt %-100 wt % of $ZrO_2$, based on the total weight of the ceramic raw materials in a).

Accordingly, the non-clay materials (II) comprise a calcium containing material chosen from wollastonite, diopside, tremolite, garnet, and mixtures thereof; a zirconium containing material that comprises from 45 wt %-100 wt % of $ZrO_2$ and one or more of feldspars, nepheline syenite, talc, corundum, quartz minerals, or mixtures thereof.

As used herein, ceramic raw materials are meant to be raw materials which upon processing and firing would result in a (fired) ceramic material. These ceramic raw materials might be natural or synthetic, such as minerals, frits, sintered materials, etc.

The ceramic raw materials are selected so that the ceramic material after firing has a composition comprising a combination of oxides as defined herein. The skilled person is aware and understands how to calculate the proportion of each available ceramic raw material (clayey and non-clayey) based on their respective compositions, and how to combine them, to obtain the targeted composition of the ceramic material after firing. Specific ceramic raw materials may be exchanged by alternative materials with different composition, e.g., as they might be available in a certain geographic area, adjusting its proportion and the proportions of the other raw materials in the ceramic raw material mixture.

The ceramic raw materials used for the manufacture of the fired ceramic material are commercially available from well-known suppliers. The ceramic industry normally distinguishes between two groups of ceramic raw material, clay materials and non-clay materials. The ceramic raw materials of the disclosure comprise clay materials and non-clay materials. The amount of clay materials might range from 25 wt %-45 wt % of the total weight of ceramic raw materials. The amount of non-clay materials might range from 55 wt %-75 wt %. In an embodiment, the ceramic raw materials in a) comprise of 25 wt %-45 wt % clay materials and from 55 wt %-75 wt % of non-clay materials; that is, the sum of the amount of clay materials and no-clay materials is 100 wt %.

The clay materials are those exhibiting high plasticity, and might include bentonite clays, fire clays, stoneware clays, kaolin, ball clay, or mixtures thereof. Plasticity is the ability of the material to deform under a stress without rupture and without tendency to returning to the initial shape, a parameter broadly used to classify the raw materials in the ceramic industry. The clay materials, for example, comprise from 5 wt %-35 wt %, or from 15 wt %-30 wt % of kaolin, related to the total weight of the ceramic raw materials. Kaolin refers to a clay containing the mineral kaolinite as its principal constituent, such as with more than 80 wt % kaolinite. The kaolin is, e.g., a low iron (e.g., $Fe_2O_3$ content <1.0 wt %) kaolin having more than 30 wt % of $Al_2O_3$.

According to an embodiment, the clay materials comprise 1 wt %-15 wt %, or 2 wt %-10 wt % of bentonite, based on the total weight of the ceramic raw materials. Therefore, in an embodiment, the ceramic raw materials comprise 1 wt. %-15 wt %, or 2 wt %-10 wt % of bentonite based on the total weight of the ceramic raw materials.

The non-clay materials are those exhibiting low or no significant plasticity, and functionally work typically as fluxes, fillers, opacifiers, pigments or other additives. The non-clay materials may comprise feldspar, quartz minerals, nepheline syenite, talc, corundum, or mixtures thereof.

The ceramic raw materials comprise from 4 wt %-12 wt % of a calcium containing material or mineral selected from wollastonite, diopside, tremolite, garnet and mixtures thereof, based on the total weight of the ceramic raw materials. This calcium containing material is considered a non-clay material. In a particular embodiment, the ceramic raw materials comprise from 4 wt %-12 wt % of wollastonite, diopside or mixtures thereof, based on the total weight of the ceramic raw materials. The wollastonite and/or diopside might be natural minerals. The natural wollastonite and/or diopside materials might comprise accessory minerals. In some embodiments, the wollastonite mineral has a CaO content of at least 40 wt % in relation to the weight of the mineral. In the case of diopside mineral, the CaO+MgO content is at least from 30 wt %-45 wt % in relation to the weight of the mineral. The wollastonite and/or diopside might as well be synthetic, e.g., manufactured by high temperature treatment of other minerals, or by melting/quenching into amorphous frits, by processes known in the art. In the case of synthetic wollastonite, the CaO content of the material is of at least 43 wt % in relation to the weight of the synthetic wollastonite. Synthetic diopside has, for example, a CaO+MgO content of at least 35 wt %-50 wt % in relation to the weight of the synthetic diopside.

The wollastonite and/or diopside materials may comprise $Fe_2O_3$ in a concentration 0.7 wt. %, and/or $TiO_2$ in a concentration 0.1 wt. %, based on the weight of said materials, as measured e.g. by XRF.

The ceramic raw materials for the manufacture of the fired ceramic material of the disclosure comprise, based on the total weight of the ceramic raw materials, from 2 wt %-10 weight-% of a zirconium containing material that comprises at least 45 wt % of $ZrO_2$.

Zirconium containing materials that comprise from 45 wt %-100 wt % of $ZrO_2$ include natural zirconium containing materials (such as zircon or baddeleyite), synthetic zirconium containing materials and mixtures thereof.

According to a particular embodiment, the ceramic raw materials for the manufacture of the fired ceramic material of the disclosure comprise either 4 wt %-10 weight-% of a zirconium containing material or mineral chosen from a material comprising from 45 wt %-69 wt % of $ZrO_2$ (such as zircon), or from 2 wt %-5 wt % of a zirconium containing material comprising from 70 wt %-100 wt. % of $ZrO_2$ (such as baddeleyite), based on the total weight of the ceramic raw materials. The zirconium containing materials are considered in the group of the non-clay materials. The ceramic raw materials comprise from 4 wt %-10 wt % of zircon, or from 2 wt %-5 wt % of baddeleyite, based on the total weight of the ceramic raw materials. Suitably, the zircon and baddeleyite are natural minerals, although they might be synthetic as well, e.g., zircon may be synthesized by fusion of $SiO_2$ and $ZrO_2$ in an arc furnace. The zircon and baddeleyite natural minerals might comprise accessory minerals. In some embodiments, the zircon materials have a $ZrO_2$ content of at least 45 wt % and the baddeleyite materials have a $ZrO_2$ content of at least 70 wt %, in relation to the weight of the material.

In some embodiments, the non-clay materials (ii) comprise:

from 4 wt %-12 wt % of a calcium containing material chosen from wollastonite, diopside, tremolite, garnet, and mixtures thereof, and from 4 wt %-10 wt % of a zirconium containing material that comprises from 45 wt %-55 wt % of $ZrO_2$, such as from 4 wt %-10 wt % of zircon, based on the total weight of the ceramic raw materials in a).

In embodiments, the non-clay materials comprise a magnesium containing material, such as a magnesium silicate. The magnesium containing material may be talc (or steatite). The magnesium containing material, magnesium silicate, or talc, may have a composition comprising at least 28 wt % MgO, or at least 30 wt % MgO, and up to 31.7 wt % MgO, related to the weight of the magnesium containing material. The magnesium containing material, magnesium silicate, or talc, may be comprised in a range from 1 wt %-10 wt %, or 2 wt %-8 wt % related to the weight of the ceramic raw materials.

In a particular embodiment, the non-clay materials (ii) comprise:

4 wt %-12 wt % of a calcium containing material selected from wollastonite, diopside, tremolite, garnet and mixtures thereof, and 4 wt %-10 wt % of a zirconium containing material that comprises 45 wt %-55 wt % of $ZrO_2$, such as 4 wt %-10 wt % of zircon, 1 wt %-10 wt % of a magnesium containing material that comprises at least 28 wt % of MgO, such as 1 wt %-10 wt % of talc, based on the total weight of the ceramic raw materials in a).

The non-clay materials might comprise quartz minerals, understood as minerals having a quartz content higher than 70 wt %. The inventors found however that when the ceramic raw materials, if they comprise any quartz mineral, they comprise, based on the total weight of the raw ceramic materials, <5 wt %, or <3 wt %, or <1 wt % of quartz mineral with a quartz content higher than 70 wt % based on the weight of the quartz mineral. In some embodiments, the ceramic raw materials do not comprise quartz mineral with a quartz content higher than 70 wt % based on the weight of the quartz mineral. The non-clay materials may comprise from 0 wt %-5 wt % of a quartz mineral with a quartz content higher than 70 wt % based on the weight of the quartz mineral. That is, it does either not comprise a quartz mineral with a quartz content higher than 70 wt % based on the weight of the quartz mineral, or, if it comprises such quartz mineral, it is present in an amount not higher than 5 wt %, based on the total weight of the raw ceramic materials. The quartz minerals might be chosen from the group of quartz, feldspathic sand, flint, silica sand, or mixtures thereof. Without wanting to be bound by theory, the low content of quartz minerals is thought to minimize the effect of expansion/shrinkage of the ceramic material during firing and subsequent cooling, caused by quartz phase inversion, what translates into lower internal stresses in the fired ceramic material produced. The reduction of internal stresses achieved by the low quartz raw material content is particularly advantageous in large format fired ceramic materials, since they are more prone to be fragile and to fracture when cut and/or handled if those stresses are present.

In a particular embodiment, the non-clay materials (ii) comprise, based on the weight of the ceramic raw materials in a):

4 wt %-12 wt % of a calcium containing material selected from wollastonite, diopside, tremolite, garnet and mixtures thereof, and 4 wt %-10 wt % of a zirconium containing material that comprises 45-55 wt % of $ZrO_2$, such as 4-10 wt % of zircon, 1 wt %-10 wt % of a magnesium containing material that comprises at least 28 wt % of MgO, such as 1-10 wt % of talc, 0 wt %-5 wt % of a quartz mineral with a quartz content higher than 70 wt %.

In embodiments, the non-clay materials might also comprise carbonates such as calcite or dolomite. However, in some embodiments, the carbonate content in the ceramic raw materials, if present, is weight-%, or weight-%, or 0 wt %-3 wt %, or 0 wt. %-1 wt %, based on the total weight of the ceramic raw materials.

In some embodiments, when the fired ceramic material is intended to have a high whiteness, the combination of all the ceramic raw materials for the manufacture of the ceramic agglomerates in step a) may comprise $Fe_2O_3$ in a concentration 0.6 wt. %, or 0.5 wt. %, and/or $TiO_2$ in a concentration 0.3 wt. %, or 0.15 wt. % based on the weight of the ceramic raw materials. That is, said materials might not comprise $Fe_2O_3$ and/or $TiO_2$, or if present, they are in an amount lower than the wt % disclosed above.

The manufacture of the fired ceramic material comprised in the slabs or tiles starts with the provision of discrete ceramic agglomerates (e.g., granulates, particulates or powders) from ceramic raw materials. In an example, for the manufacture of the ceramic agglomerates, the raw materials might be ground in a ball mill with water to produce an aqueous slip, which might be stored after sieving for later use. The slip is then spray-dried by pulverizing the slip through nozzles in an air stream of hot air, removing most of the water and producing the discrete ceramic agglomerates which are discharged from the lower part of the spray-drier.

Other methods for the manufacture of the discrete ceramic agglomerates are possible, known in the technique, and within the scope of the disclosure. Thus, for instance, the ceramic agglomerates might be manufactured by grinding the raw materials without addition of large amounts of water, e.g., in pendular or hammer mills, and afterwards agglomerated in powder granulators with a small amount of water.

The term discrete means that the agglomerates have not been shaped or molded, e.g., in the form of a layer, but are in the form of individual or discrete units.

The discrete ceramic agglomerates have a humidity of from 4 wt %-10 wt %, based on the weight of said agglomerates. The size of the diameter (particle size) of the agglomerates may range suitably from 125 micrometers-800 micrometers.

In the present application, the term "agglomerates" usually refers to individual or discrete units (e.g., granulates, particulates, or powder particles). Thus, the term encompasses units ranging from infinitesimal powder particulates up to comparatively large pellets of material. This term encompasses discrete products of a variety of shapes and sizes, including grain particles, granulates, fines, powders, or combinations of these.

The discrete ceramic agglomerates are then shaped to form a shaped material, such as a layer, which might be continuous or discrete. Shaping shall be understood as the collection of a plurality of the discrete ceramic agglomerates into a defined and repeatable form or shape, e.g., by dispensation to a surface, or into a mold. The shaped material or layer is of uniform thickness, homogeneous, with minimal density and composition variations. To achieve the shaped material or layer of ceramic agglomerates, for example, the ceramic agglomerates might be transported from a reservoir where they are stored to a dispensing system which deposits them onto a moving conveyor belt or to a molding cavity. Forming systems as the one described are known in the art, for example for the formation of shaped materials or layers from spray dried ceramic agglomerates. Other shaped material or layer forming methods are possible, known and within the disclosure.

The shaped material or layer of ceramic agglomerates is compacted (e.g. subsequently) to high pressures. In a particular embodiment, step b) comprises shaping and then compacting. The compaction is, for example, conducted by means of a hydraulic axial press or a double-belt press, or a combination of both, e.g., using a double-belt press for a pre-compaction step, before the shaped material or layer is compacted in an axial press. The maximum pressure during compaction preferably reaches at least 350 kg/cm$^2$, or from 350 kg/cm$^2$-600 kg/cm$^2$, or from 400 kg/cm$^2$-600 kg/cm$^2$, or from 500 kg/cm$^2$-600 kg/cm$^2$. The high pressures favor the production of fired ceramic materials with higher mechanical strength and minimum porosity.

The shaped compacted material, in embodiments, is provided with a length of at least 1.2 m and a width of at least 0.6 m, or at least 2.4 m length and at least 1.2 m width. In an embodiment, the shaped compacted material is provided with at least 3.1 m length and at least 1.4 m width. The length of the compacted material may be 1.2 m-3.5 m, with a width 0.6 m-1.6 m, or 2.4 m-3.5 m length and 1.2 m-1.6 width, or 3.1 m-3.5 m length and 1.4 m-1.6 m width. In case the shaped material forms a continuous layer, the desired length/width combination can be provided by trimming this layer either before compacting (e.g. when using axial pressing compaction) or after compacting (e.g. when using double-belt press compaction).

In the embodiments herein, layers, deposits or precursors thereof, may be applied to the compacted unfired material (i.e., after step b)), for example to one or both major surfaces of the compacted unfired ceramic material, with the aim to provide decoration, protection, texturization, functionality or other superficial effects to the fired ceramic material. Such layers, deposits or precursors thereof include for example glazes, engobes, frits, grits, inks, their precursors, or mixtures thereof. By precursor it is meant the substances, materials, mixtures, or compositions, which result in the layers or deposits after being fired simultaneously with the compacted unfired material. Additionally, or alternatively, the layers, deposits or precursors thereof may be applied to the ceramic material after firing (i.e., after step c)), and optionally subjecting the layers, deposits or precursors thereof on the fired ceramic material to subsequent additional steps such as firing, hardening or drying.

Optionally, the compacted unfired ceramic material, with or without additional layers, deposits or precursors thereof, can be dried to reduce the humidity content to from 0.0 wt %-1.0 wt %, or from 0.0 wt %-0.7 wt %, based on the weight of the compacted unfired ceramic material, before the compacted material is fired (i.e., before step c)). This can be done for instance with the unfired ceramic material in horizontal orientation using conventional ceramic driers.

After compaction and optional drying, the compacted (unfired) ceramic material is fired with a temperature profile having the maximum in the range from 1,100° C.-1,300° C., or from 1,150° C.-1,250° C., such as from 1,170° C.-1,230° C., or from 1,170° C.-1,220° C. In an embodiment, the temperature profile has a maximum in the range 1,100° C.-1,215° C., or 1,150° C.-1,210° C. The temperature firing profile (or firing cycle) suitably includes pre-heating, heating and cooling phases, the cooling phase ending when the temperature reaches 60° C. The firing profile (including pre-heating, heating, and cooling phases) preferably has a duration ranging from 60 minutes-500 minutes, such as 70 minutes-440 minutes, depending on the thickness of the ceramic material. The residence time at the maximum temperature ranges from 10 minutes-50 minutes, depending on the thickness of the ceramic material. In an embodiment, the residence time at the maximum temperature ranges, e.g., from 30 minutes-70 minutes. Firing can be conducted in a roller kiln for high temperature or other type of kiln used for ceramic products. This maximum firing temperature results in sintering, reaction, and vitrification of the compacted raw materials, increasing the compactness and hardness of the fired ceramic material.

After firing, the tile or slab can be cut and/or calibrated to the desired final dimensions, and may be finished (polished, honed, etc.) on one or both of its larger surfaces, depending on the intended application.

Unless otherwise specified, the proportions and concentrations of ceramic raw materials presented in this description refer to the dry materials, obviating or disregarding any humidity they might content.

It should be understood that the scope of the present disclosure includes all the possible combinations of embodiments disclosed herein.

The term "comprises" encompasses the terms "consisting essentially of" and "consisting of". Thus, at each occurrence in the present application, the term "comprising" may be replaced with the term "consisting essentially of" or "consisting of".

Definitions and Testing Methods

XRF: Oxide analysis can be conducted by X-Ray Fluorescence in a commercial XRF spectrometer. For example, a disc of about 1 g of a sample is mixed with lithium tetraborate and calcined in air atmosphere at a temperature 1,050° C. for 25 minutes prior to analysis in the spectrometer. The results are reported as relative weight percentage of oxides ($SiO_2$, $Al_2O_3$, etc.), together with the weight 'lost on ignition' during calcination (evaporation/desorption of volatiles, decomposition of organic matter). The spectrometer is previously calibrated with multipoint calibration curves of known concentration of standards. The international standard ISO 12677:2011 may be followed for XRF analysis.

XRD: As way of example, the identification and quantification of crystalline phases can be done by powder X-Ray Diffraction (XRD) and the Rietveld method, combined with the use of an internal standard. This method allows to quantify the overall amorphous phase as well. The internal standard methodology requires a known amount of reference standard (corundum, for example) to be thoroughly mixed and homogenized with each sample to be analyzed, optionally employing a small amount of isopropanol or other mixing/homogenizing adjuvant. A Ge(111) monochromator generating CuKα1 radiation and a X'Celerator detector of a commercial equipment (e.g. PANalytical X'Pert Pro automated diffractometer) may be used. X-Ray diffraction patterns of powder may be recorded between 4°-70° in 2θ at 60 s/step, while rotated to increase particle statistics distribution. Once the X-ray powder diffraction data is obtained, a software (e.g. DIFFRAC.EVA by Brucker) can be used to carry out the identification of the crystalline phases by comparison with catalogued diffraction patterns. The quantification by the crystalline and amorphous phases may be conducted with Rietveld refinement method, e.g. by using the TOPAS software (by Coelho Software). The content of crystalline phases and overall amorphous phase is calculated as weight percentage of the sample analyzed, after subtracting the amount of the internal standard used.

The particle size, also called particle diameter, of the agglomerates can be measured by known screening separation using sieves of different mesh size. The term "particle size" as used herein, means the range in which the diameter of the individual particles in the agglomerates falls. It can be measured by particle retention or passage on calibrated sieves that have measured mesh size openings, where a particle will either pass through (and therefore be smaller than) or be retained by (and therefore larger than) a certain sieve whose size openings are measured and known. Particle sizes are defined to be within a certain size range determined by a particle's ability to pass through one sieve with larger mesh openings or 'holes" and not pass through a second sieve with smaller mesh openings. For agglomerates with a particle size <200 micrometers, the particle size distribution can be measured by laser diffraction with a commercial equipment (e.g., Malvern Panalytical Mastersizer 3000 provided with a Hydro cell). For the measurement the agglomerate sample might be dispersed in demineralized water assisted by an ultrasound probe. The laser diffractometer provides particle distribution curves (volume of particles vs. particle size) and the D10, D50, and D90 statistical values of the particle population (i.e., particle size values where 10%, 50% or 90% of the sample particle population lies below this value, respectively).

Water absorption and apparent density of the fired ceramic layer were measured according to ISO 10545-3: 2018 (vacuum method).

Colorimetry may be measured by using a spectrophotometer, such as a Ci64 spectrophotometer from X-Rite Inc. This spectrophotometer is normally located over the clean surface of a representative area of the sample to be analyzed, at room temperature, and the measurement is done following the manufacturer instructions. The result averaged from three measurements is given as coordinates L*, a* and b* in the CIE Lab color space.

The Pyroplastic Index (PI) indicates the tendency of a material to deform during firing under controlled conditions. To determine the PI, a probe of known dimensions is arranged bridging over two supports and subject to a firing cycle. The PI is calculated as:

$$PI = \frac{sb^2}{l^4}$$

Where s is the maximum deformation of the probe determined optically, b is the probe thickness and l the distance between the supports. When all the parameters are entered in centimeters, the IP has $cm^{-1}$ dimensions. The PI may be measured by an optical fleximeter, e.g. the Misura FLEX fleximeter of Expert System Solutions S.r.l.

Shrinkage during firing may be measured following the ISO 10545-2:2018.

EXAMPLES ACCORDING TO THE DISCLOSURE AND COMPARATIVE EXAMPLES

Example 1

One mixture A (with a composition comprising a combination of oxides according to the disclosure) and two different comparative mixtures B and C were similarly separately prepared by adding raw materials and water to a ball grinding mill and then collecting the slip formed after the mixtures are homogeneous and the particle size is predominantly under 63 micrometers (with a maximum of 1.0% of particles above this size). The slip mixtures were then partially dried to a humidity content of approximately 7.5 wt %, molded and pre-compacted with a pressure of 450 $kg/cm^2$ to 100×50 $mm^2$ shaped test samples with a thickness of 7.0 mm.

The raw materials of the mixtures A, B and C included clay materials in an amount of from 30 wt %-40 wt %, and non-clay materials in an amount from 60 wt %-70 wt %. The wt % did not consider any humidity or water content of the raw materials. The sum of clay and non-clay materials added up 100 wt %.

The clay materials comprised different amounts of bentonites, ball clays, and/or kaolins. The non-clay materials included different amounts of feldspars, talc minerals, and/or alumina. The clay and non-clay raw materials were commercially available products obtained from suppliers known to the skilled person. The amount of each raw material is adjusted, taking their compositions into account, to result in the fired composition after firing listed in Table 1 below.

Mixtures A, B and C comprised 5.0 wt %-6.0 wt % bentonite, related to the total weight of raw materials in those mixtures.

The raw materials for mixture A comprised also 7.0 wt %-8.0 wt % wollastonite, while mixtures B and C did not comprise any wollastonite. In the other hand, mixture A did not comprise any quartz mineral with a quartz content higher than 70 wt % (that is, a mineral mixture where quartz is predominant, such as quartz mineral or feldspathic sands), while mixtures B and C comprised from 3 wt %-10 wt % of feldspathic sand having from 80 wt %-85 wt % of quartz.

Mixture A comprised additionally 8.0 wt % of zircon, mixture B comprised 12.0 wt % of zircon, and mixture C comprised 17.0 wt % zircon.

The mixtures A, B and C comprised 3.5 wt %-5.0 wt % of talc, the talc comprising >30 wt % of MgO.

The molded test samples were then pressed with a pressure reaching 450 $kg/cm^2$ before they were dried at 110° C. to decrease humidity content to <1.0% wt % and then, they were fired in a muffle furnace for 110 minutes reaching a maximum temperature of 1,190° C., resulting in corresponding fired test samples A, B and C.

The compositions of the fired test samples A, B and C obtained determined by XRF are depicted in table 1.

TABLE 1

| Component | Test sample A (wt %) | Test sample B (wt %) comparative | Test sample C (wt %) comparative |
|---|---|---|---|
| $SiO_2$ | 57.2 | 57.6 | 56.9 |
| $Al_2O_3$ | 21.6 | 19.8 | 18.8 |
| CaO | 4.9 | 0.5 | 0.5 |
| MgO | 1.5 | 1.4 | 1.5 |
| $ZrO_2$ | 3.9 | 6.6 | 9.4 |
| $Fe_2O_3$ | 0.3 | 0.3 | 0.3 |
| $TiO_2$ | 0.1 | 0.1 | 0.1 |
| $Na_2O$ | 2.4 | 2.2 | 2.1 |
| $K_2O$ | 3.0 | 3.2 | 3.3 |
| Other oxides | 0.3 | 0.5 | 0.5 |
| L.O.I.‡ | 4.8 | 7.8 | 6.6 |
| Ratio $SiO_2/Al_2O_3$ | 2.6 | 2.9 | 3.0 |
| CaO + MgO | 6.4 | 1.9 | 2.0 |
| $Fe_2O_3$ + $TiO_2$ | 0.4 | 0.4 | 0.4 |

‡Weight lost on ignition

The different crystalline phases formed during firing for the three test samples A, B and C, and their relative concentration, as measured by XRD are listed in Table 2.

TABLE 2

| Phase | Test sample A (wt %) | Test sample B (wt %) comparative | Test sample C (wt %) comparative |
|---|---|---|---|
| Quartz [$SiO_2$] | 5.2% | 9.9% | 8.7% |
| Zircon [$ZrSiO_4$] | 7.1% | 11.3% | 16.8% |
| Anorthite [$CaAl_2Si_2O_8$] | 15.1% | — | — |
| Mullite [$Al_6Si_2O_{13}$] | — | 14.1% | 11.8% |
| Albite [$NaAlSi_3O_8$] | 6.4% | 1.4% | — |
| Amorphous phase | 66% | 63% | 63% |

The XRD results in Table 2 evidence the differences in crystalline mineral phases formed during firing for the different compositions. The mullite phase goes from being majoritarian among the crystalline phases in test sample B, to being not measurable in test sample A. In exchange, the crystalline mineral phases dominant in test sample A are from mineral phases containing calcium.

Table 3 shows a comparison of properties of the test samples before and after firing:

TABLE 3

| Parameter | | Test sample A | Test sample B comparative | Test sample C comparative |
|---|---|---|---|---|
| Mechanical stability of compacted sample before drying [$kg/cm^2$] | | 10.3 | 9.4 | 9.9 |
| Mechanical stability of compacted sample before firing [$kg/cm^2$] | | 40.7 | 39.5 | 42.1 |
| Pyroplastic Index (PI) [$cm^{-1}$] | | $3.4 \times 10^{-5}$ | $6.2 \times 10^{-5}$ | $6.8 \times 10^{-5}$ |
| Shrinkage during firing | | 6.8% | 9.2% | 9.8% |
| Apparent density after firing (ISO 10545-3: 2018) [$g/cm^3$] | | 2.39 | 2.57 | 2.63 |
| Water absorption after firing (ISO 10545-3: 2018) | | ≤0.01% | ≤0.01% | ≤0.01% |
| Breaking strength after firing (ISO 10545-4: 2019) [$kg/cm^2$] | | 672 | 670 | 688 |
| Colorimetry | L* | 89.29 | 88.78 | 90.80 |
| | a* | −0.32 | −0.01 | 0.18 |
| | b* | 4.63 | 5.60 | 5.55 |

Compared with test samples B and C, the test sample A shows a significantly reduced apparent density after firing, together with an importantly lower firing shrinkage. The reduction in firing shrinkage is an advantage of great relevance when considering the industrial production of tiles in large format of more than 3.0 m length and 1.2 m width, where significantly more square meters of fired tiles can be obtained from unfired pressed tiles of same size with the composition of test sample A compared to B and C.

Without wanting to be bound by theory, it seems the formation of crystalline phases containing calcium and/or sodium during firing, which have a lower packing density than mullite and zircon, helps reducing the density and shrinkage of the test sample A compared to samples B and C.

Simultaneously, the decreased Pyroplastic Index for test sample A compared to B and C indicates a lower tendency to deformation of the molded sample during firing. This parameter is again of special relevance when considering the manufacture of large format tiles with thickness of up to 3.0 cm, where deformation during firing translates into defects and internal material stresses.

The advantages mentioned are obtained for test sample A, without the mechanical stability being compromised (either before or after firing), and while still achieving an outstanding whiteness and colorimetry. The water absorption in all three cases remains negligible, below 0.01%, indicating a nearly absent open porosity.

Example 2

Mixture D (with a composition comprising a combination of oxides according to the disclosure) and three different mixtures E, F and G were prepared following the same general process as for samples A-C.

Mixture D, E and F were prepared following what has been described above for Mixture A in Example 1, however, while mixture D (as mixture A) comprised about 3 wt %-5 wt. % of talc (having a MgO content of >30 wt %), mixtures E and F did not comprise any talc. Additionally, mixture F did not comprise any bentonite. Mixture D comprised about 8 wt % zircon, mixture E about 8.4 wt % zircon, and mixture F about 8.9 wt % zircon.

Mixture G comprised about 18 wt % of illitic clay, and about 10 wt % kaolin. Mixture G further comprised about 10 wt % feldspathic sand (having 80 wt %-85 wt % of quartz), about 5 wt % zircon, 2 wt % calcite, 10 wt % of a frit (having 26 wt % CaO, 12 wt % $ZrO_2$, 55 wt % $SiO_2$ and 2 wt % $Al_2O_3$ relative to the weight of the frit), and 45 wt % sodium feldspar. Different to Mixture D, Mixture G did not comprise any wollastonite, bentonite or talc. Mixture G comprised about 28 wt % clay materials and about 72 wt % of non-clay materials.

As in Example 1, molded test samples from mixtures D-G were pressed with a pressure reaching 450 $kg/cm^2$ before they were dried at 110° C. to decrease humidity content to <1.0 wt % and then, they were fired in a muffle furnace for 110 minutes reaching a maximum temperature of 1,190° C., resulting in corresponding fired test samples D, E, F and G.

The compositions of the fired test samples D, E, F and G obtained determined by XRF are depicted in table 4.

TABLE 4

| Component | Test sample D (wt %) | Test sample E (wt %) | Test sample F (wt %) | Test sample G (wt %) |
|---|---|---|---|---|
| $SiO_2$ | 60.2 | 61.4 | 59.6 | 64.9 |
| $Al_2O_3$ | 20.6 | 21.7 | 22.0 | 17.8 |
| CaO | 3.8 | 3.8 | 4.1 | 4.4 |
| MgO | 1.9 | 0.3 | 0.2 | 0.2 |
| $ZrO_2$ | 4.7 | 4.8 | 5.2 | 4.1 |
| $Fe_2O_3$ | 0.4 | 0.3 | 0.3 | 0.2 |
| $TiO_2$ | 0.1 | 0.1 | 0.1 | 0.3 |
| $Na_2O$ | 2.6 | 2.8 | 3.0 | 4.8 |
| $K_2O$ | 3.4 | 4.0 | 3.7 | 0.9 |
| Other oxides | 0.5 | 0.3 | 0.3 | 0.3 |
| L.O.I.‡ | 1.8 | 0.5 | 1.5 | 2.1 |
| Ratio $SiO_2/Al_2O_3$ | 2.9 | 2.8 | 2.7 | 3.6 |
| CaO + MgO | 5.7 | 4.1 | 4.3 | 4.6 |
| $Fe_2O_3 + TiO_2$ | 0.5 | 0.4 | 0.4 | 0.5 |

‡Weight lost on ignition

Table 5 shows a comparison of properties of the test samples D-G before and after firing:

TABLE 5

| Parameter | | Test sample D | Test sample E | Test sample F | Test sample G |
|---|---|---|---|---|---|
| Mechanical stability of compacted sample before firing [kg/cm$^2$] | | 43.6 | 36.8 | 19.3 | 11.3 |
| Water absorption after firing at 1,190° C. (ISO 10545-3: 2018) | | ≤0.01% | 0.94% | 3.2% | 12.9% |
| Breaking strength after firing (ISO 10545-4: 2019) [kg/cm$^2$] | | 699 | 594 | 473 | 232 |
| Colorimetry | L* | 87.8 | 88.8 | 90.1 | 91.6 |
| | a* | −0.03 | 0.6 | 0.86 | 0.4 |
| | b* | 5.6 | 5.4 | 5.6 | 7.5 |

Test samples E, F and G present low concentration of MgO in their composition, since no talc or bentonite was used in their corresponding mixtures. Compared with test sample D, samples E-G show a marked reduction in the mechanical stability of the compacted sample before firing.

The mechanical stability of the unfired ceramic material is of critical importance especially when manufacturing large format slabs or tiles, i.e. with dimensions larger than 1.2 m×0.6 m. The large format compacted unfired ceramic material needs to be transported by belts, rollers, through different stations in the production line, before they are fired. Such stations between the press and the firing kiln normally include stations for application of layers (e.g. glazes, decorative layers), drying kilns, etc. A lower value of mechanical stability before firing means that the compacted unfired ceramic material is more prone to deform, crack or break during its transport, causing lower production efficiency and higher waste ratio.

Simultaneously, the test samples E-G present high values of water absorption and reduced mechanical strength against fracture. In contrast, the composition comprising a combination of oxides according to the disclosure (sample D) led to very low values of water absorption and high mechanical strength against fracture even when the firing was performed at a temperature lower than 1,200° C., which represents at least an economic advantage compared to other methods for manufacture that require higher temperatures.

In view of the low mechanical stability of the unfired ceramic material, and their reduced mechanical strength and elevated water absorption after firing, the compositions of mixtures E-G are considered not suitable for the industrial manufacture of tiles or slabs of large format.

Example 3

The formulations for the test sample A and comparative test sample B in Example 1 were employed as base for the manufacture at industrial scale of tiles of approximately 3.2 m length and 1.4 m width, and with a thickness of about 2 cm. Tiles A comprised a fired ceramic layer based on the formulation for the test sample A, while comparative Tiles B comprised a fired ceramic layer based on the formulation of the test sample B.

In the industrial production of the fired ceramic layers in Tiles A and B, the same basic steps as for the preparation of the test samples A and B were followed. However, in the industrial manufacture, after wet grinding of the raw materials in the ball mill, the slips were partially dried in an industrial spray-drier to obtain powders having a humidity content of 8.5% and with particle sizes predominantly <800 micrometers. The powders are then shaped by dispensing them as a uniform layer on a forming belt and pre-compacted before they are subjected to compaction to a pressure of at least 450 kg/cm$^2$. The compacted (unfired) ceramic layer was cut to a length of 3.55 m and a width of 1.63 m, and were further dried until a humidity content of from 0.0 wt %-1.0 wt % was reached, before they were fired in a roller kiln reaching a maximum temperature of around 1,190° C. and a residence time at this maximum temperature of about 10 minutes-30 minutes.

Table 6 shows the average composition of the fired ceramic layer in the Tiles A and B obtained.

TABLE 6

| Component | Tiles A (wt %) | Tiles B (wt %) comparative |
|---|---|---|
| $SiO_2$ | 59.8 | 60.8 |
| $Al_2O_3$ | 20.4 | 20.3 |
| CaO | 4.1 | 0.5 |
| MgO | 2.0 | 1.4 |
| $ZrO_2$ | 4.8 | 6.8 |
| $Fe_2O_3$ | 0.4 | 0.4 |
| $TiO_2$ | 0.1 | 0.1 |
| $Na_2O$ | 2.7 | 2.4 |
| $K_2O$ | 3.2 | 3.6 |
| Other oxides | 0.4 | 0.4 |
| L.O.I. | 2.1 | 3.3 |
| Ratio $SiO_2/Al_2O_3$ | 2.9 | 3.0 |
| Sum CaO + MgO | 6.1 | 1.9 |
| Sum $Fe_2O_3 + TiO_2$ | 0.5 | 0.5 |

The fired ceramic layer of Tile A had a length and width after firing of 3.34*1.52 m, while the fired ceramic layer of Tile B had a length and width of 3.24*1.47 m, meaning the fired ceramic layer of Tile A had a 6.6% surface increase in relation to the fired ceramic layer of Tile B.

The apparent density of the fired ceramic layer was 2.35 g/cm$^3$ and 2.57 g/cm$^3$ for Tile A and Tile B, respectively. In both cases of Tile A and Tile B, the water absorption of the fired ceramic layer was 0.01%.

Tiles A and B were cut at 90° and 45° angles with a CNC bridge saw provided with a commercial freshly sharpened disk appropriate for porcelain stoneware. The maximum speed was recorded, at which the disk can be moved as it cuts through the tile at 2400 rpm producing clean cuts, without chipping or tile cracking. While Tile B maximum cutting speed could not be increased beyond 0.8 m/min, since it would either chip or crack, Tile A could be cut to 1.3 m/min without problems.

In another example, Tiles A and B were cut at 90° C. using a CNC bridge saw provided with commercial unused disks appropriate for porcelain stoneware. The cuts were done at 2400 rpm, longitudinally along the length of the tile, and separated 2 cm apart. In total, cuts extended for more than 200 linear meters. While Tile B could not be cut at speeds over 0.8 m/min without the appearance of chipping or even fracture of the tile, the Tile A could be cut at speed of 1.6 m/min or even higher without presenting similar problems.

The invention claimed is:

1. A tile or slab comprising a fired ceramic material, wherein the fired ceramic material has a length of at least 1.2 m and a width of at least 0.6 m, and has a chemical composition comprising a combination of oxides according to:

| | |
|---|---|
| $SiO_2$ | from 54.0 wt %-64.0 wt % |
| $Al_2O_3$ | from 17.5 wt %-23.0 wt % |
| CaO | from 2.7 wt %-6.8 wt % |
| MgO | from 1.0 wt %-5.5 wt % |
| $ZrO_2$ | from 2.0 wt %-5.8 wt % |

based on the total weight of the fired ceramic material.

2. The tile or slab according to claim 1, wherein the weight percentage of $ZrO_2$ ranges from 3.1 wt %-5.8 wt %, based on the total weight of the fired ceramic material.

3. The tile or slab according to claim 1, wherein a sum of the weight percentages of CaO+MgO ranges from 4.3 wt %-7.3 wt %, based on the total weight of the fired ceramic material.

4. The tile or slab according to claim 1, wherein the fired ceramic material has a chemical composition comprising one or more of:

from 56.0 wt %-62.0 wt % of $SiO_2$;

from 18.3 wt %-22.3 wt % of $Al_2O_3$;

from 3.2 wt %-5.5 wt % of CaO; and from 1.2 wt %-3.8 wt % of MgO;

based on the total weight of the fired ceramic material.

5. The tile or slab according to claim 1, wherein the fired ceramic material has a chemical composition further comprising one or more of:

from 1.5 wt %-3.8 wt % of $Na_2O$;

from 1.0 wt %-4.2 wt % of $K_2O$;

from 0.05 wt %-0.6 wt % of $Fe_2O_3$; and from 0.05 wt %-0.3 wt % of $TiO_2$;

based on the total weight of the fired ceramic material.

6. The tile or slab according to claim 1, wherein the fired ceramic material has a chemical composition comprising a combination of oxides according to:

| | |
|---|---|
| $SiO_2$ | from 56.0 wt %-62.0 wt % |
| $Al_2O_3$ | from 18.3 wt %-22.3 wt % |
| CaO | from 3.2 wt %-5.5 wt % |
| MgO | from 1.2 wt %-3.8 wt % |
| $ZrO_2$ | from 3.1 wt %-5.8 wt % |

-continued

| | |
|---|---|
| $Fe_2O_3$ | from 0.05 wt %-0.6 wt % |
| $TiO_2$ | from 0.05 wt %-0.3 wt % |

based on the total weight of the fired ceramic material.

7. The tile or slab according to claim 1, wherein the fired ceramic material comprises less than 10 wt % of mullite as crystalline phase based on the total weight of the fired ceramic material.

8. The tile or slab according to claim 1, wherein the fired ceramic material comprises at least 40 wt % of amorphous phase, based on the total weight of the fired ceramic material.

9. The tile or slab according to claim 1, wherein the fired ceramic material has a length of at least 2.4 m and a width of at least 1.2 m.

10. The tile or slab according to claim 1, wherein the tile or slab further comprises a layer or deposit of one or more of porcelain, glaze, engobe, ink, frit, and grit.

11. A kitchen or vanity countertop, kitchen splashback, shower tray, wall or floor covering, furniture cladding, tabletop, ventilated façade tile, stovetop, stair step, or fireplace made from the title or slab as according to claim 1.

12. A method for manufacturing the tile or slab according to claim 1, comprising:

a) preparing discrete agglomerates of ceramic raw materials;

b) shaping and compacting the agglomerates to provide a shaped and compacted material, the shaped and compacted material having a length of at least 1.2 m and a width of at least 0.6 m; and c) firing the shaped and compacted material with a temperature profile having a maximum between 1,100° C. and 1,300° C.;

wherein the ceramic raw materials of step a) comprise:

(i) from 25 wt %-45 wt % of clay materials, wherein the clay materials comprise one or more of kaolin, bentonite clays, fire clays, stoneware clays, ball clays, and mixtures thereof; and (ii) from 55 wt %-75 wt % of non-clay materials, wherein the non-clay materials comprise one or more of feldspars, nepheline syenite, talc, corundum, quartz minerals, and mixtures thereof, based on the total weight of said ceramic raw materials; and wherein the non-clay materials (ii) comprise:

from 4 wt %-12 wt % of a calcium containing material chosen from wollastonite, diopside, tremolite, garnet, and mixtures thereof, and from 2 wt %-10 wt % of a zirconium containing material comprising from 45 wt %-100 wt % of $ZrO_2$, based on the total weight of the ceramic raw materials in a).

13. The method according to claim 12, wherein the non-clay materials (ii) comprise, based on the total weight of the ceramic raw materials, from 0 wt %-5 wt % of a quartz mineral with a quartz content higher than 70 wt %.

14. The method according to claim 12, wherein the compacting in step b) is performed by applying a pressure ranging from 350 $kg/cm^2$-600 $kg/cm^2$.

15. The method according to claim 12, further comprising providing a layer, deposit or a precursor thereof, of a glaze, pigment, engobe, grit, frit, ink or a combination thereof on the shaped and compacted material obtained after step b).

16. The tile or slab according to claim 1, wherein the fired ceramic material has a thickness from 3 mm-40 mm.

17. The tile or slab according to claim 1, wherein the fired ceramic material has a thickness from 12 mm-40 mm.

* * * * *